FIGURE I.

Oct. 17, 1967 J. J. VAN VENROOY 3,347,020
PROCESS AND APPARATUS FOR GAS CHROMATOGRAPHY
Filed Oct. 4, 1965 6 Sheets-Sheet 4

INVENTOR.
JOHN J. VAN VENROOY
BY Donald R. Johnson
ATTORNEY

Oct. 17, 1967    J. J. VAN VENROOY    3,347,020
PROCESS AND APPARATUS FOR GAS CHROMATOGRAPHY
Filed Oct. 4, 1965    6 Sheets-Sheet 6

GAS CHROMATOGRAPHY APPARATUS.

INVENTOR.
JOHN J. VAN VENROOY
BY Donald R. Johnson
ATTORNEY

United States Patent Office 3,347,020
Patented Oct. 17, 1967

3,347,020
PROCESS AND APPARATUS FOR GAS CHROMATOGRAPHY
John J. Van Venrooy, Media, Pa., assignor to Sun Oil Company, Philadelphia, Pa., a corporation of New Jersey
Filed Oct. 4, 1965, Ser. No. 492,747
5 Claims. (Cl. 55—67)

ABSTRACT OF THE DISCLOSURE

It has been found that gas chromatography separations can be carried out in a process in which the packing material used in the process is an open celled high molecular weight foam polymeric material. The pore openings, which are the result of the wall membranes having been removed from the cells, are in the range of about 5 to 20 mm. in diameter. A suitable material for example is reticulated polyurethane foam. Reticulated polyurethane is skeletal in nature and results from the hydrolytic action of water in the presence of a catalyst on the wall membranes of open celled foam. By using this material in the gas chromatography process, it is possible to obtain the separation phase and the support therefore in a single material. The polymeric materials employed are such as they have both polar and non-polar sites of controlled strength so that both polar and non-polar materials and mixtures thereof can be separated in the chromatography process without drift or tailing which is so often encountered in the chromatographic analysis of polar material. Also the unique structure of the open celled foams causes a very low pressure drop through the chromatographic column.

---

Figure 1:
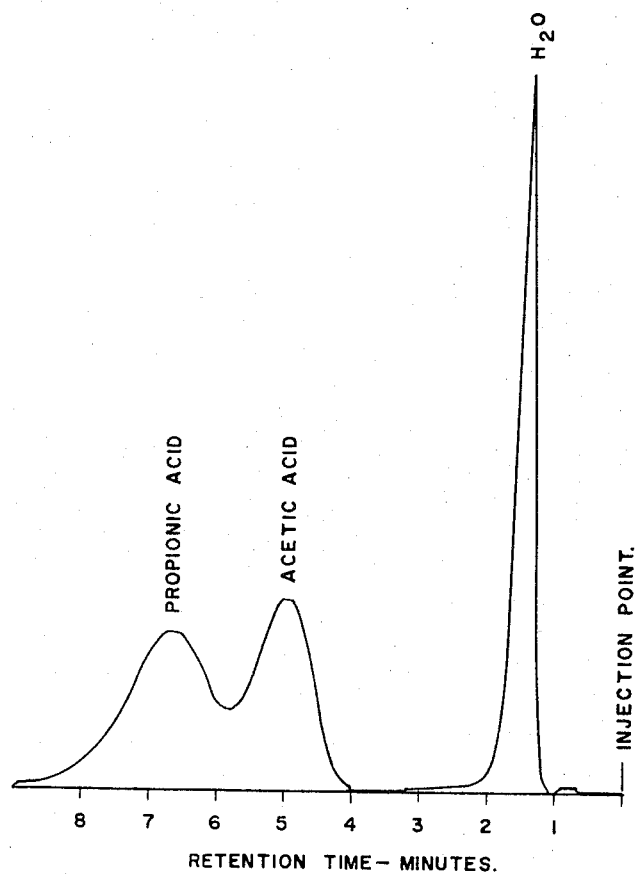

The present invention relates to chromatographic analyzers and particularly to the chromatographic column used for making such analyses. More particularly the present invention relates to the packing material of the chromatographic column.

Gas chromatography is analytical technique that has found use in the determination of trace components, preparation of pure materials and the monitoring of process streams to name a few applications. A sample of material to be analyzed is passed in an inert gas carrier through a column which is usually packed with a particular material which is selected to obtain a particular separation. In effect the constituents of the sample are removed from the carrier gas and retained in the packing. The carrier gas also acts as eluting gas and removes particular constituents in a particular order from the packing material. As the constituents are eluted from the packing material and pass out of the column, they pass through a sensitive detector. Because of the nature of the chromatographic column, small samples of material for analysis are fed into the column. Where a continuing analysis is desired, for instance, in process control, a series of small samples are fed into the column at interval sufficient to allow the previous samples to have been completely eluted.

It has been the usual practice in gas chromatography to employ a support material with a liquid partitioning phase applied thereon as the column packing. The support material is usually chosen to be one with a high specific surface area. Celite, firebrick and other diatomaceous earth materials were considered good support materials. A serious defect of diatomaceous earth materials is their adsorptivity towards the polar constituents of the sample. In order to overcome this deficiency, these support materials are siliconized with chlorosilane which reduces the number of polar sites. Other support materials have also been employed instead of the diatomaceous earth materials to avoid this problem. These include a number of fluorocarbon support materials such as polytetrafluoroethylene and glass beads. The use of these substitute materials to overcome the problem of polar adsorption results in greatly reduced surface areas.

The choice of the liquid partition phase is dependent on the nature of the sample components to be separated. The liquid chosen limits the temperature at which a system may be operated. Recently high molecular weight compounds such as polyester succinate, polyethylene glycols and silicone gum rubber have been used extensively particularly where high operating temperatures are needed for separation. The liquid partition phase is usually applied to the support material by means of a volatile solvent such as chloroform or xylene.

There are basically three types of operations that are carried out in chromatography columns (1) isothermal (2) temperature programmed, and (3) flow programmed. In the isothermal operation substantially one temperature is maintained for the gas chromatographic analysis of a sample. In temperature programming the temperature is raised through a definite temperature range over a given period of time.

In each system the carrier gas is an inert gas such as helium, nitrogen, argon, hydrogen, carbon dioxide and the rare inert gases such as neon.

There are a number of differential methods of detection which are suitable for use in gas chromatography systems, for instance thermal conductivity, flame ionization, $\beta$-ray ionization, gas-density balance, infrared, mass spectrometry, radioactivity and election capture. The detector will transmit a signal, usually by electrical impulse, to a recorder of the type that draws graphs such as those in FIGURES 1-5 or to a control device, for instance in process control, or to both.

It is an object of the preesnt invention to provide an improved packing material for gas chromatography columns.

A further object is to provide a column packing material which is more easily prepared than previous materials.

Another object is to provide a single material to serve as support material and partition phase.

A further object is to provide a column packing material having a wider range of application than those presently available.

Another object is to provide a gas chromatography system with high separation efficiency without high gas flow pressure drop through the column.

A further object is to provide a method for the separation of chemical materials, polar and/or non-polar, which has high separation efficiency over a wide temperature range.

The objects of the present invention are achieved by the use of open-celled type foams. The foams may be prepared in situ in the chromatography column, foamed and cut into pieces which fit into the column or foamed and ground to a particle size convenient for loading into the chromatographic column being prepared. The open-celled foams are preferably produced from high molecular weight polymers, i.e, molecular weight of 20,000 to 3,000,000. The term polymer is used to describe both homopolymers and copolymers.

Suitable open-celled foams which may be employed are epoxy resin, silicone resin, polyurethane resin, polystyrene resin, urea-formaldehyde resin, phenol-formaldehyde resin, styrene-butadiene copolymer, butadiene-styrene-acrylonitrile copolymer and the like. The foams employed may be rigid, semirigid or elastomeric.

The foamed plastics of the present invention should have as much open-celled structure as possible in order to provide large surface area and to allow the gases to pass through easily. A foam that has a large percent of closed cells may be made operable for use according to the present invention by physical methods such as by grinding or crushing or chemical methods such treatment with strong base so that the closed-celled structure is substantially destroyed.

One theory which accounts for the success of the foams but which is not intended to limit the invention is that the high molecular weight foamed polymers act in the same manner as the high molecular weight liquid partition phase and at the same time provide their own support.

The size of pores in the open-celled foam is not critical but should be in the range of from 0.05 to 20 mm. The open-celled foams may be produced by any of the methods known and described in the prior art such as those found on pages 36 to 205 of "Plastic Engineering Handbook" 3rd edition, Reinhold Publishing Corp., New York, 1960; U.S. Patent Nos. 3,165,483 and 3,171,820.

Although the foams may be produced in situ in the chromatographic column, it is preferred that the foam is produced externally in molds and subsequently cut or ground and placed in the column. This allows greater control over the uniformity of the foamed material. When foamed material is packed into the column, only a moderate pressure should be applied to pack it uniformly in order to avoid crushing the cell structure which reduces the available surface area and closes the passage through the column.

Any of the inert carrier gases used in the prior art may be used with the foamed material.

The foamed packing material of the present invention may be used in any conventional chromatography column in place of the prior art packing. The foamed packing material of the present invention will be particularly useful in large size commercial columns for producing high purity chemical materials. The temperature at which the chromatographic columns of the present invention may be operated are from ambient temperature or lower up to a temperature where significant decomposition of the open-celled foam occurs. Preferred operating temperatures are from about 20 to 500° C. particularly from about ambient to 300° C.

A particularly important feature of the present chromatographic column packing materials is the presence of both polar and non-polar sites of controlled strength thus allowing polar, non-polar or mixtures of polar and non-polar chemical materials to be separated efficiently.

The open-celled foamed materials of the present invention are inert at the temperatures at which the separations are conducted.

The present invention may be better understood by reference to the drawings.

Figure 2:
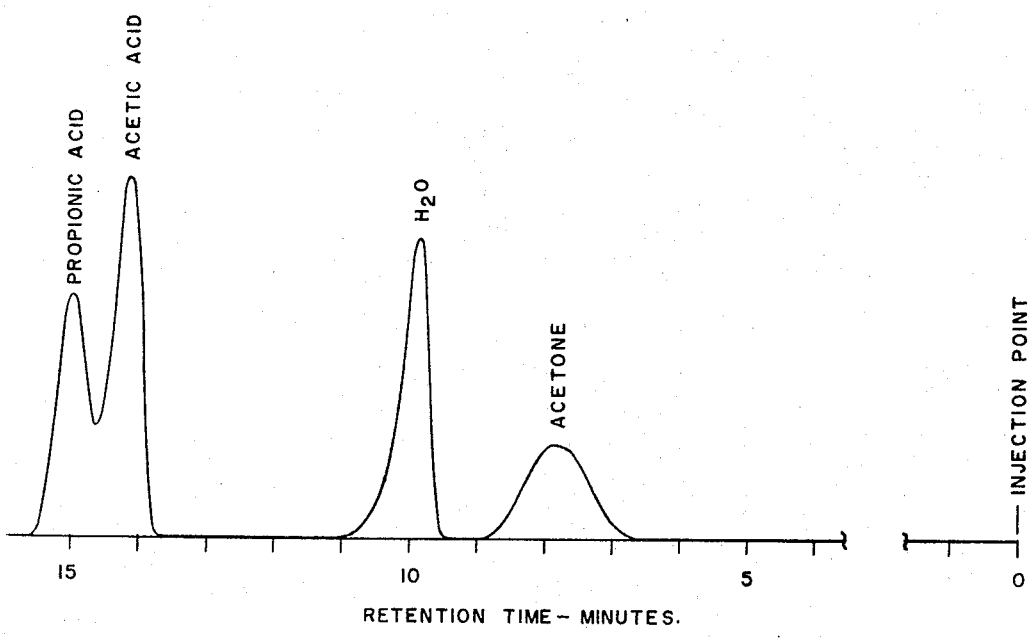
Figure 3:
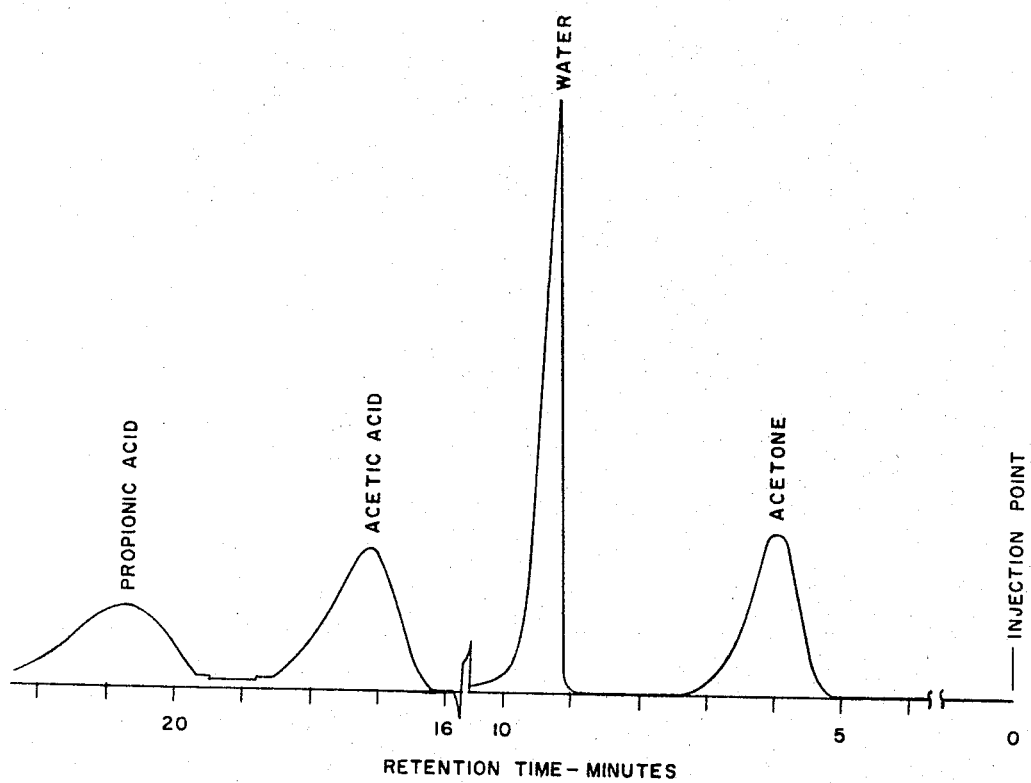
Figure 4:
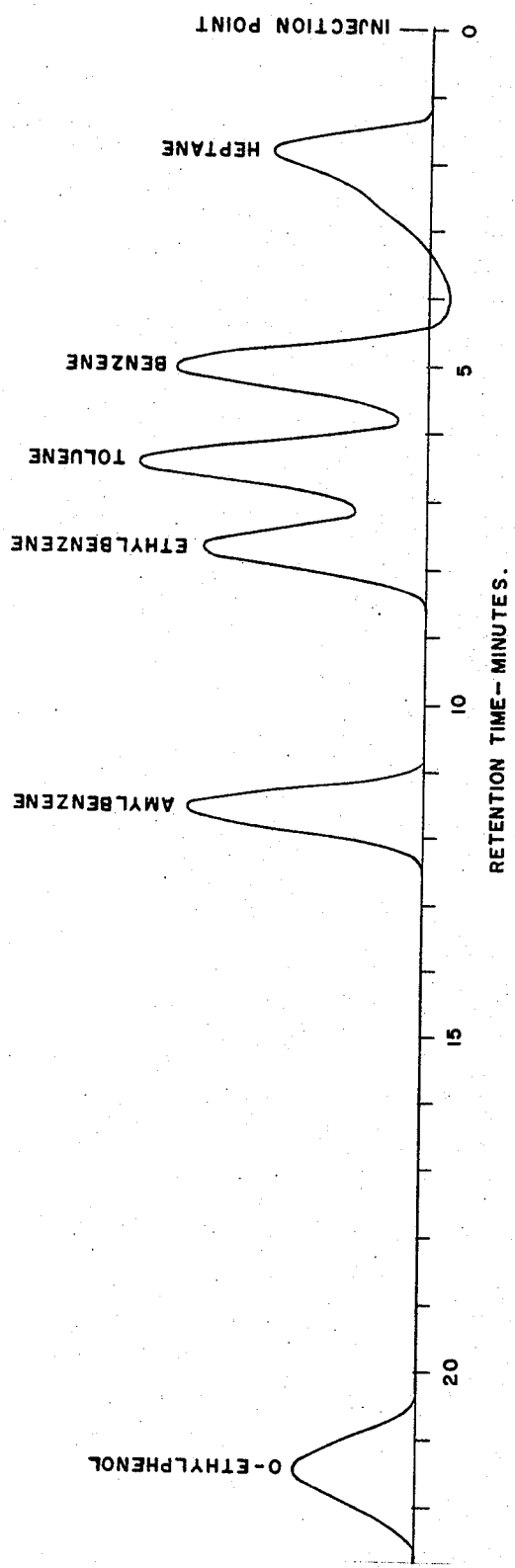
Figure 5:
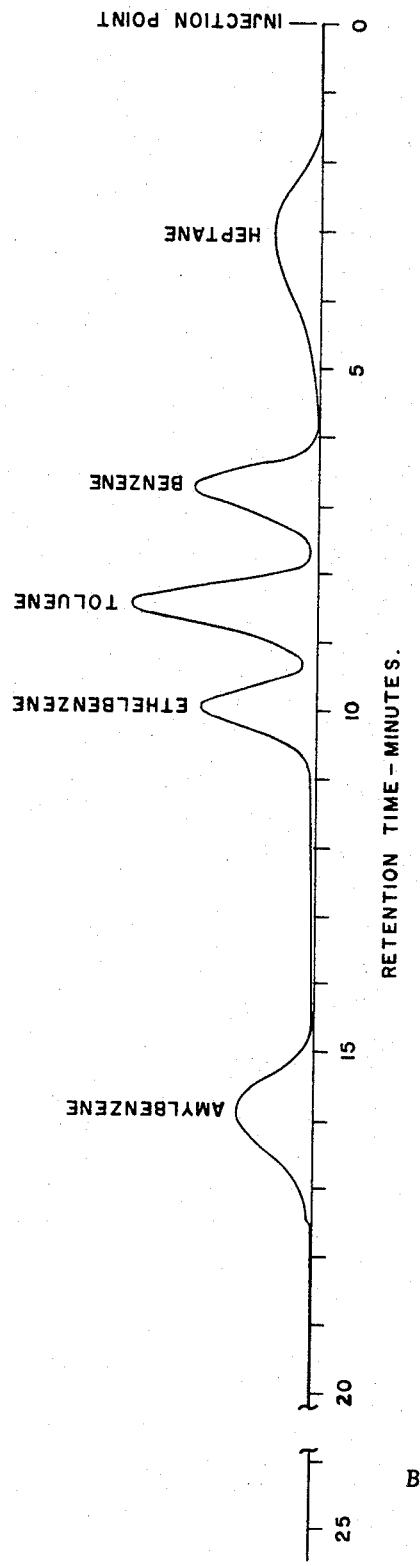
Figure 6:
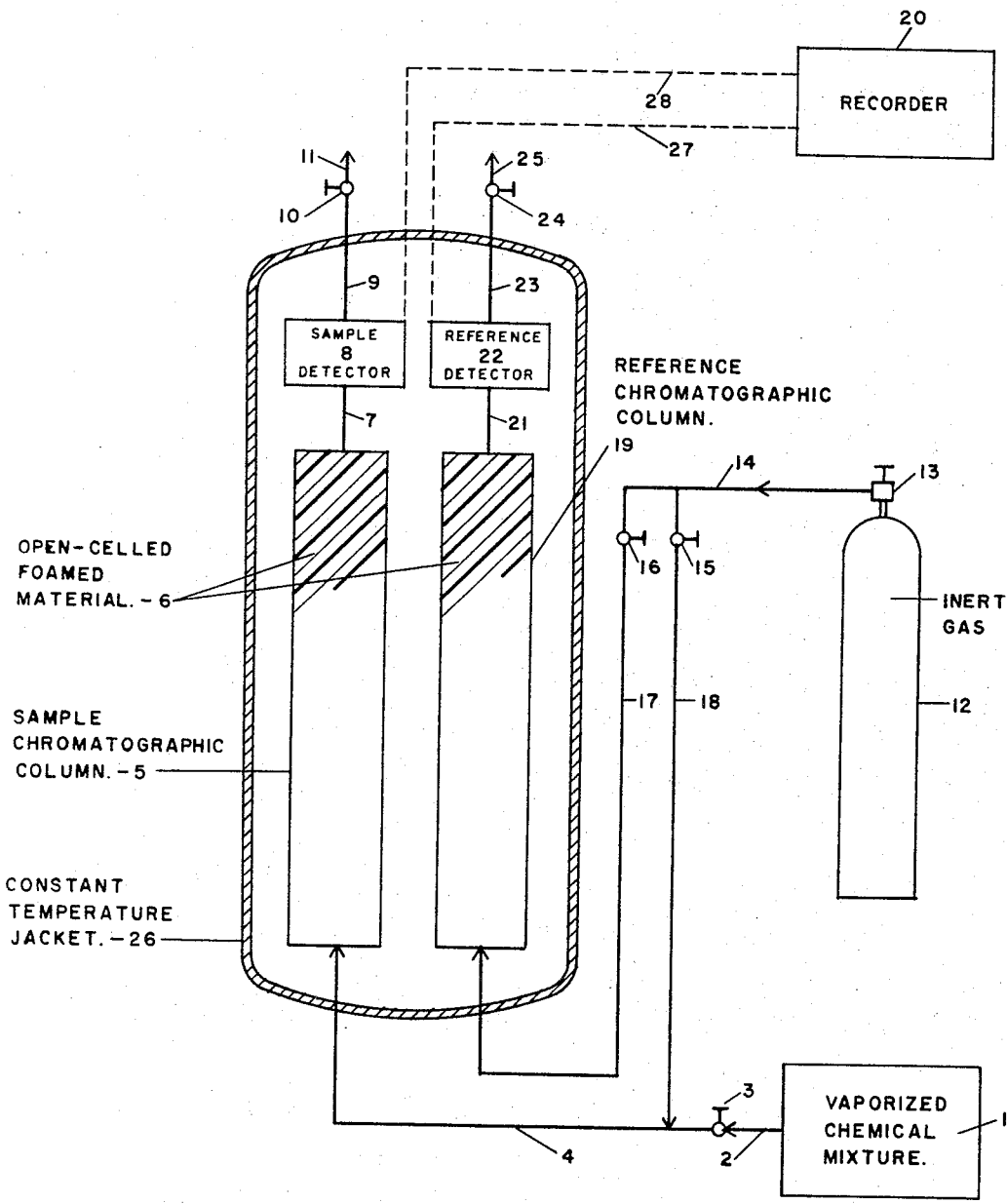

FIGURE 1 is the chromatogram of a chemical mixture.
FIGURE 2 is the chromatogram of a chemical mixture.
FIGURE 3 is the chromatogram of a chemical mixture.
FIGURE 4 is the chromatogram of a chemical mixture.
FIGURE 5 is the chromatogram of a chemical mixture.
FIGURE 6 is a flow sheet of a preferred mode and schematic showing of the apparatus.

Referring now to FIGURE 6, a tank 12 containing an inert gas such as helium is provided, which is controlled by valve 13. Line 14 leads into pressure regulators 15 and 16, which suitably reduce the pressure and discharge helium into lines 18 and 17 respectively. Admitted into line 18 is the vaporized chemical mixture which is introduced by line 2 through valve 3. The helium and vaporized chemical mixture then flow through line 4 into the sample chromatographic column 5 which is packed with an open-celled foamed material 6. The column 5 resolves the vaporized chemical mixture into the constituents which flow sequentially from the column 5 by line 7 into the sample detector 8, for example, a thermal conductivity cell. A signal is conducted from the sample detector 8 by electrical lead 28 into a recorder system 20 which contains a Wheatstone bridge device and may be of the type that graphically indicates the elution times and proportions of constituents flowing to sample detector 8. The effluent gases pass from sample detector 8 through line 9 and vented through line 11 by way of valve 10.

The helium discharged by valve 16 into line 17 flows into reference chromatographic column 19, which is packed with an open-celled foamed material 6. The helium passes through the reference chromatographic column 19 and into reference detector 22, which is of the same type as sample detector 8, by way of line 21. The helium is vented from reference detector 22 by passing through line 23 and into line 25 by way of valve 24. A signal is conducted from reference detector 22 by electrical lead 27 into recorder system 20.

The sample chromatographic column 5, reference chromatographic column 19, sample detector 8 and reference detector 22 are all housed in a temperature controlled jacket which may be operated isothermally or according to a temperature program.

The following examples are provided to illustrate the invention and are not intended to limit its scope.

EXAMPLE I

A Beckmann GC2A chromatography column is packed with 13.2 grams of reticulated polyurethane foam prepared according to U.S. Patent 3,171,820 issued to Robert A. Volz. The column was an 8 foot copper tube with a ¼ inch outside diameter. The reticulated polyurethane foam was cut into pieces of slightly less than ¼ inch diameter and pushed into the tube with moderate pressure. The foam was semi-rigid and had about 14 cells per linear inch. The detector employed was of the thermal conductivity type.

Using helium as the carrier gas at a flow rate of 52 cc./minute the apparatus was operated isothermally at several temperatures and the retention time in minutes determined for a variety of chemical compounds. These data are shown in Table I.

TABLE I

| Compound | Min. Ret. Time @ 40° C. | Min. Ret. Time @ 70° C. | Min. Ret. Time @ 130° C. | Min. Ret. Time @ 160° C. | Compound, B.P., ° C. |
|---|---|---|---|---|---|
| Acetone | 10.0 | 4.3 | | | 56.5 |
| Air | 0.7 | 0.7 | | | |
| Diethyl Ether | 1.5 | | | | 34.6 |
| CS₂ | 5.2 | 2.3 | | | 46.3 |
| CHCl₃ | 26.0 | 9.2 | 2.2 | | 61.2 |
| CH₃CHO | 0.7 | | | | 20.2 |
| CCl₄ | | 4.4 | | | 76.8 |
| C₆H₆ | | 8.0 | 2.1 | | 80.1 |
| Acetic Acid | (¹) | (¹) | 10.9 | 4.7 | 118.1 |
| Propionic Acid | (¹) | | | 6.4 | 141.1 |
| Water | | 10.4 | 1.8 | 1.2 | 100.0 |
| Octane | | 2.5 | 1.1 | | 125.7 |
| Toluene | | 15.7 | 3.1 | | 110.8 |
| Heptane | | 1.5 | | | 98.4 |
| Amyl Benzene | | | 13.7 | | 205.3 |
| Ethlbenzene | | | 4.1 | | 136.2 |
| Formic Acid | | | 12.3 | | 100.8 |
| Isopropyl Alcohol | | | 1.5 | | 82.5 |

EXAMPLE II

Using the same apparatus as in Example I and 46 cc./min. helium flow rate, two microliters of a mixture of water, acetic acid and propionic acid were injected into the carrier gas at the bottom of the chromatography column. The results are shown in FIGURE 1.

EXAMPLE III

Two copper tubes 8 feet long having ¼ inch outsitde diameter were each packed with 13.2 grams of reticulated polyurethane foam as in Example I and installed in a Beckmann Thermotrac Temperature Programmer connected to the detection system of the Beckmann GC2A chromatograph. A five microliter sample of a mixture of acetone, water, acetic acid and propionic acid was injected into the Thermotrac unit programmed for 3 minutes isothermal at 70° C., followed by heating at a rate sufficient to reach 270° C. in 5 minutes with a sample helium flow rate of 46 cc./min. and a reference helium flow rate of 36 cc./min. The chromatogram of this separation is shown in FIGURE 2. All of the sample was eluted in 16 minutes.

EXAMPLE IV

Using the same apparatus as in Example III but with a conventional packing material of 16 wt. percent Carbowax 1000[1] on Fluoropak 80[2] 5 microliters of the same mixture of Example III were injected into the Thermotrac unit programmed for three minutes at 70° C., 5 minutes to 180° C. (temperature limitation because of bleeding of the partition phase) at a flow rate of 75 cc./minute sample and 75 cc./minute reference. The chromatogram for this separation is shown in FIGURE 3. The time required for the elution was 22 minutes. Had the same flow as that used in Example III been employed, the conventional column would have been less efficient than column of the present invention in the separation.

EXAMPLE V

Using the same apparatus of Example III with the reticulated foam packing a 4 microliter sample of a mixture of heptane, benzene, toluene, ethylbenzene, amylbenzene and orthoethylphenol was injected into the Thermotrac unit programmed for 110 to 260° C. in 15 minutes at a flow rate of 46 cc./min. for the sample and 36 cc./min. for the reference. All compounds were eluted within 22 minutes. The chromatogram for this separation is shown in FIGURE 4. The pressure drop across the column at 110° C. was 2 p.s.i.g. and at 260° C., 7.5 p.s.i.g., i.e., a change in pressure drop when programmed of 5.5 p.s.i.g. If the change in pressure drop is considered to be essentially linear then the change in pressure drop per ° C. is 0.037 p.s.i.g.

EXAMPLE VI

Using the same apparatus as in Example III but with a conventional packing material of 16 wt. percent carbowax 1000 on Fluoropak 80 a 4 microliter sample of the same mixture as in Example V was injected into the Thermotrac unit programmed for 70 to 180° C. in 10 minutes at 75 cc./min. for the sample and 75 cc./min. for the reference. Orthoethylphenol was not eluted even after 35 minutes operating time. The chromatogram for ---
[1] Carbowax 1000 is the Union Carbide Chemical Co. trademark for polyethylene glycols which are polymers of ethylene oxide with the formula $HOCH_2(CH_2OCH_2)_nCH_2OH$ where $n$ represents the average number of oxyethylene groups (approximately 21.3) having an average molecular weight of 950–1050, melting range of 37.0–40.0, viscosity at 210° F. of 17.4 centistokes, and flash point of 510° F.
[2] Fluoropak 80 is The Fluorocarbon Co. trademark for ground polytetrafluoroethylene having full range particle size.

this separation is shown in FIGURE 5. The pressure drop across the column was 6.1 p.s.i.g. at 70° C. and 10.6 p.s.i.g. at 180° C. The change in pressure drop when programmed is the 4.5 p.s.i.g. The change in pressure dropper ° C. is 0.041 p.s.i.g.

The open-celled or reticulated foams of the present invention are more versatile than the packing materials of the prior art in their ability to operate at higher temperature with polar and non-polar samples in reasonable operaing times and at lower flow rates.

The open-celled foam materials of the present invention may be used individually or in admixture together or with other chromatographic column packing materials. Columns prepared according to the present invention may be additionally used in series with other foam columns or conventional columns. The columns of the present invention may be used for the analysis of vaporous polar or non-polar chemical material, including inorganic compounds.

The invention claimed is:

1. In a process for separating vaporous mixtures of chemical compounds by passing the vaporous mixtures and an inert carrier gas through an elongated column containing a packing material at temperatures in the range of 20 to 500° C., wherein the improvement comprises having as the packing material an open-celled foamed, high molecular weight polymeric material having polar and non-polar sites therein and having pore size in the range of from 0.05 to 20 millimeters selected from the group consisting of epoxy resin, silicone resin, polyurethane resin, polystyrene resin, urea-formaldehyde resin, phenol-formaldehyde resin, styrene-butadiene copolymer and butadiene-styrene-acrylonitrile copolymer.

2. The process according to claim 1 wherein the temperatures are in the range of ambient to 300° C.

3. The process according to claim 1 wherein the open-celled, foamed, high molecular weight polymeric material is reticulated polyurethane.

4. In an apparatus for conducting gas chromatographic analyses comprising an elongated column and a packing material therein, wherein the improvement comprises having as the packing material an open-celled foamed, high molecular weight polymeric material having polar and non-polar sites therein and having pore size in the range of from 0.05 to 20 millimeters selected from the group consisting of epoxy resin, silicone resin, polyurethane resin, polystyrene resin, urea-formaldehyde resin, phenol-formaldehyde resin, styrene-butadiene copolymer and butadiene-styrene-acrylonitrile copolymer.

5. The apparatus according to claim 4 wherein the open-celled foamed, high molecular weight polymeric material is reticulated polyurethane.

References Cited
UNITED STATES PATENTS 3,055,297    9/1962    Leeds _____ 106—122 X

OTHER REFERENCES

Winsten, Walter A., "Reversed-Phase Partition Chromatography on Microporous Polymeric Supports," Analytical Chemistry, vol. 34, No. 10, September 1962, pages 1334 and 1335.

Baum, Elliot H., "Evaluation of Microporous Polyethylene as a Low Temperature Gas Chromatographic Support," J. of G.C., November 1963, pages 13–15.

REUBEN FRIEDMAN, *Primary Examiner.*

J. DE CESARE, *Assistant Examiner.*